(No Model.) 4 Sheets—Sheet 2.
J. F. SEIBERLING.
GRAIN BINDER.
No. 426,867. Patented Apr. 29, 1890.
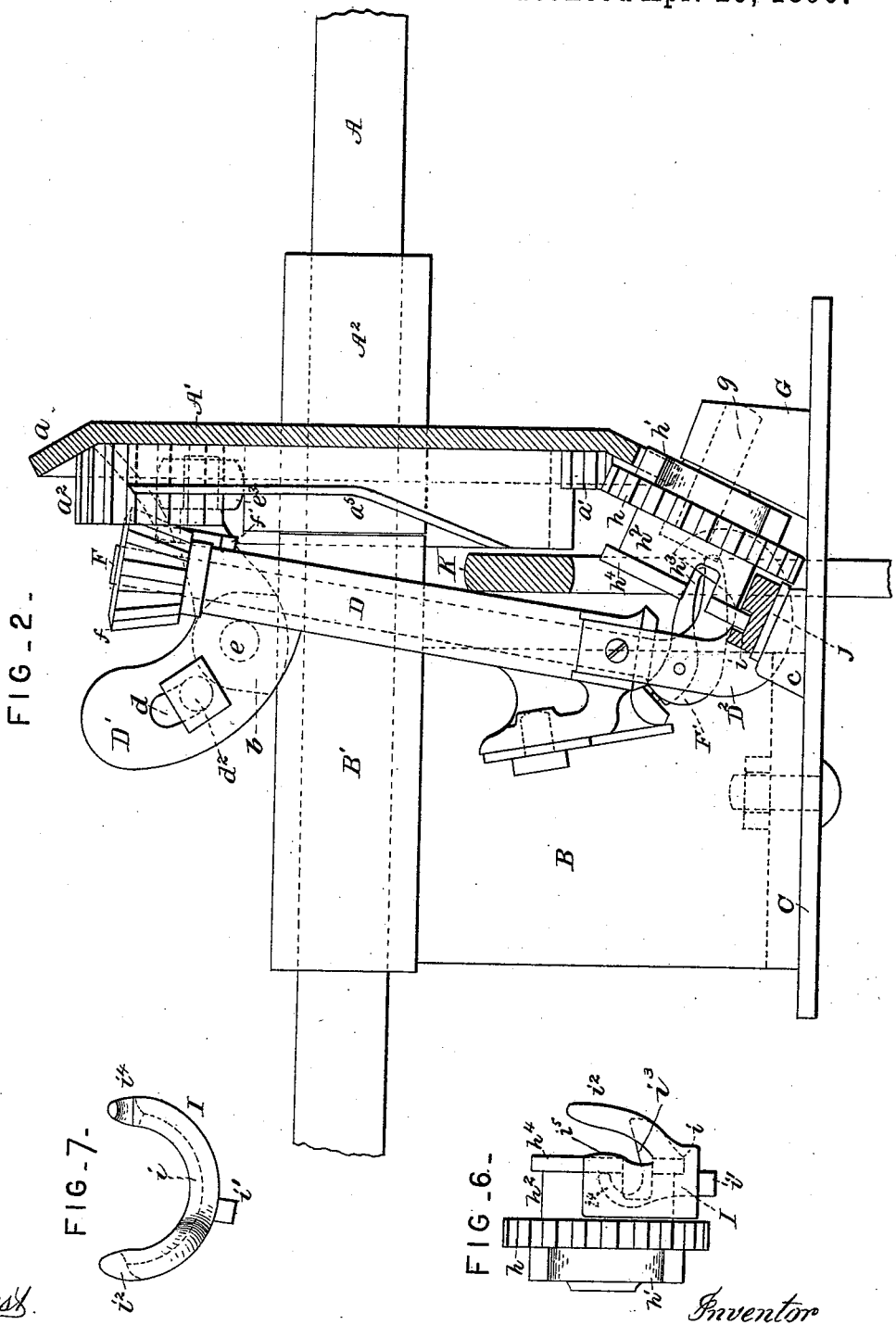
Attest.
Geo. T. Smallwood
C. Smallwood
Inventor
John F. Seiberling,
by A.L. Smith & Son.
Attorneys (No Model.) 4 Sheets—Sheet 3.
J. F. SEIBERLING.
GRAIN BINDER.
No. 426,867. Patented Apr. 29, 1890.
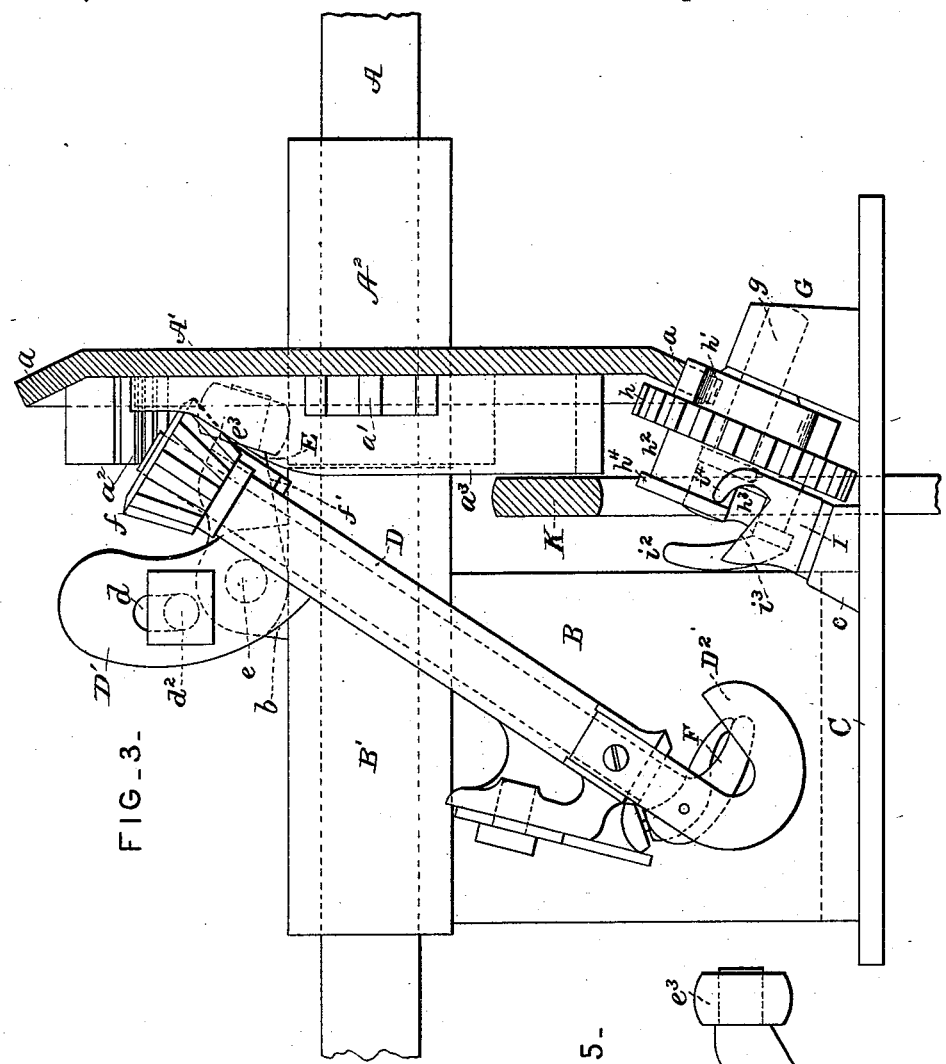
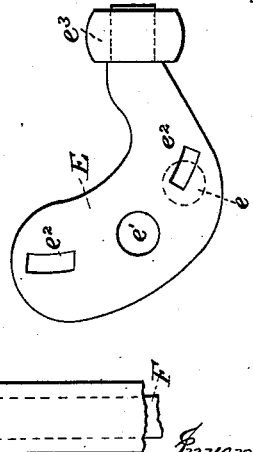
Attest
Geo. T. Smallwood
C. Smallwood
Inventor
John F. Seiberling
by A. M. Smith & Son,
Attorneys.

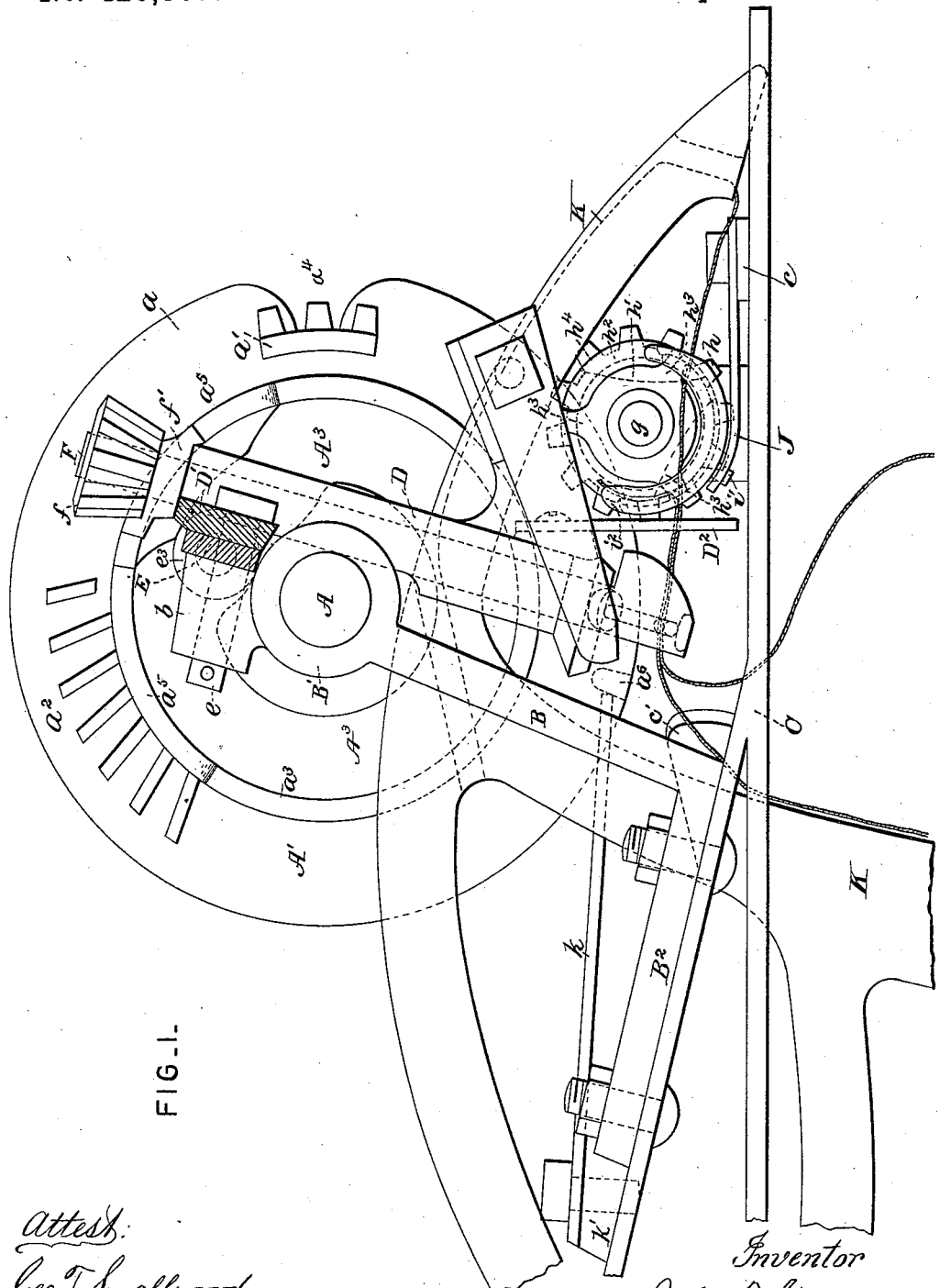

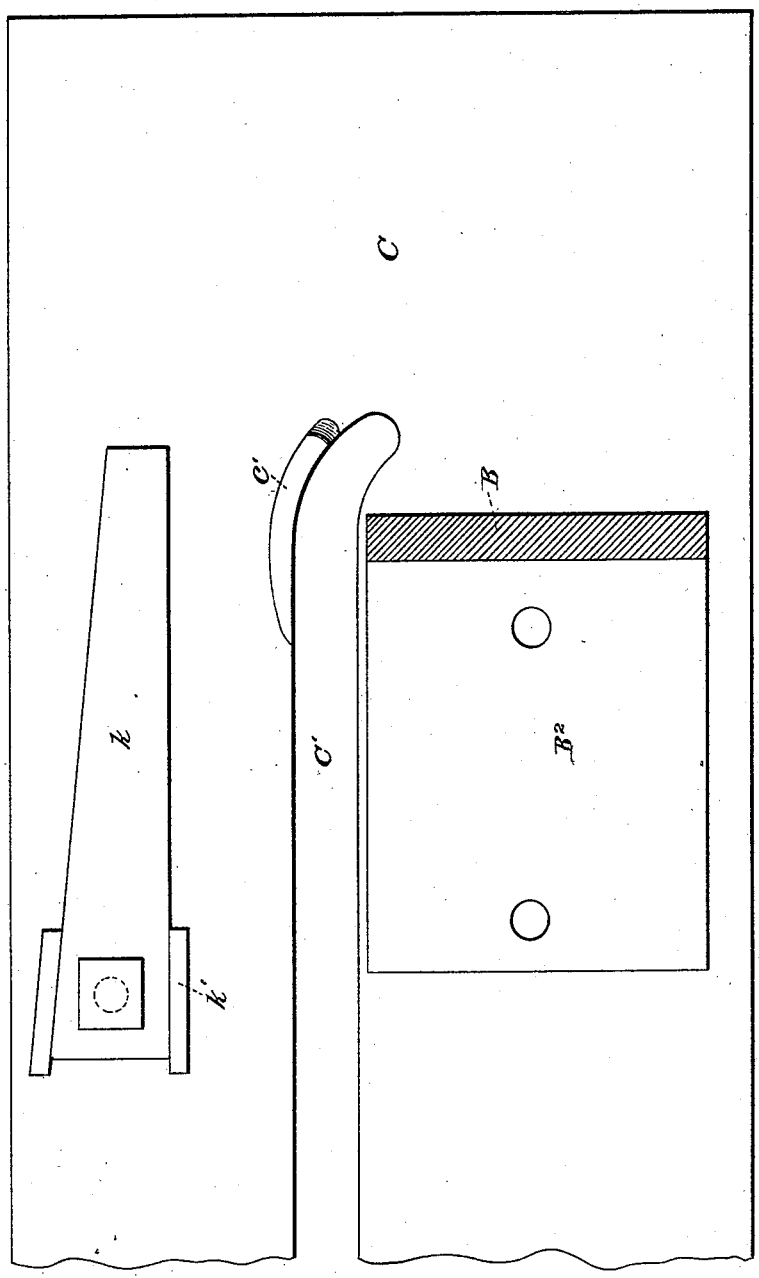

UNITED STATES PATENT OFFICE.

JOHN F. SEIBERLING, OF AKRON, OHIO.

GRAIN-BINDER.

SPECIFICATION forming part of Letters Patent No. 426,867, dated April 29, 1890.

Application filed April 21, 1888. Serial No. 271,381. (No model.)

*To all whom it may concern:*

Be it known that I, JOHN F. SEIBERLING, of Akron, county of Summit, and State of Ohio, have invented a new and useful Improvement in Grain-Binders, of which the following is a full, clear, and exact description, reference being had to the accompanying drawings, making part of this specification.

My invention relates to grain-binders of the rotating-knotter type, in which the knotter has a swinging or rocking movement imparted to it after the formation of the loop to complete and discharge the knot.

In the accompanying drawings, Figure 1 is an end elevation, partly in section, showing all the parts. Fig. 2 is a side elevation of the same with the parts in their normal position. Fig. 3 is a similar view showing the knotter and its swinging sleeve-like supporting-frame to which the knife is secured swung outward to cut the cord and discharge the knot. Fig. 4 is a view of the sleeve-like knotter-supporting frame with its adjusting-slots and the bearing for the knotter-shaft. Fig. 5 is a detail view of the rocking arm with its cam-roller and adjusting-slots, by means of which it is secured to the sleeve-like knotter-supporting frame. Fig. 6 is a side view of the cord-holding disk and its shoe. Fig. 7 is a detached rear view of the shoe. Fig. 8 is a view of a portion of the breast-plate, showing the knotter-frame in section at one side of the binder-arm slot and the cord-guide ribs or projection on the opposite side.

In the drawings, A indicates the main knotter-actuating shaft; A′, the main cam and gear wheel by which the knotter and cord-holder are actuated. The wheel A′ is constructed with its outer edge or rim inclined at an oblique angle to the body of the wheel, as shown at $a$, Fig. 2, the edge of said inclined portion $a$ serving as a track or guide for retaining the angularly-arranged cord-holder wheel. A segmental gear $a'$ is formed on said inclined rim $a$, a portion of which is cut away at $a^4$ to permit the partial rotation of the cord-disk at this point, while the segment-gear imparts at desired intervals a rotary movement to the cord-holder. The wheel A′ has also formed on its face a toothed segment $a^2$, which imparts the rotary movement of the knotter-shaft pinion, located at a point above the knotter-actuating shaft A. A cam-groove $A^3$ is also formed on the face of the wheel, which serves to control the sleeve-like knotter-supporting frame and its knife and cause it to be rocked upon its pivot to complete and discharge the knot and cut the cord. The outer or upper wall $a^3$ of this cam-groove $A^3$ serves as a flange or track to act on the cam or delay surface $f'$ on the pinion $f$ on the knotter-shaft F. This cam-track $a^3$ permits the rotation of the knotter-shaft and its pinion $f$ and cam-surface $f'$ at this point, and a depression $a^5$ in said cam-track permits the knotter, with the sleeve-like supporting-frame and knife secured thereto, to vibrate or rock to cut the cord and complete and discharge the knot.

B B² represent the main frame or casting which supports the several parts of the knotter device and also the breast-plate C. Said casting serves as a bearing for and is supported on the main knotter-actuating shaft A in the usual manner. $b$ represents a projection on said casting B above the main knotter-actuating shaft A. This lug or projection has a journaled bearing which serves as a support for the pivot or journal bolt $e$, and on which the knotter-supporting sleeve-like frame D is secured by means of its arm D′.

The arm D′, formed integral with the knotter-shaft-bearing sleeve-like frame D, is provided with an adjusting-slot $d$ and ribs $d'$ $d'$, while the arm E, which serves to rock or vibrate the arm D′, to which it is secured by a bolt $d^2$, is also provided with adjusting-slots $e^2$ $e^2$ to receive the ribs $d'$ $d'$, which serve to support and permit the adjustment of the sleeve-like frame D, as may be required. Said arm E is provided with a friction-roller $e^3$, which runs in the cam-groove $A^3$ of the cam-wheel A′ and serves to impart the rocking or vibrating movement to the knotter and its sleeve-like frame D.

The adjustment of the knotter-supporting sleeve-like frame D is important to secure the desired position of the knotter in its relation to the cord-holder and binder-arm, so that the knotter will be in proper position to gather or secure the cord in its rotation to form the knot. By placing the pivot or bearing of the rocking arm of the knotter-supporting shaft above the main shaft of the cam-wheel and inclining the knotter-shaft and its bearing obliquely to the face of said cam-wheel I am enabled to secure direct contact with the gearing without intermediate wheels or joint and secure a more desirable rocking movement of the knotter and cord-knife in their swinging sleeve-like frame, and to construct the cam and gear-wheel much smaller and lighter, and to otherwise simplify the construction and operation of this form of binder, while it also requires but slight rocking movement of the knotter-shaft pinion to secure the proper action of the knotter and knife to complete the knot and sever the cord, and I have also dispensed entirely with the complicated and expensive form of construction formerly used. There is also an advantage in placing my knotter-shaft, made in one piece, obliquely to the face of the cam-wheel, as I am enabled to advance the binder-arm K up to or near the main knotter-actuating shaft, or to raise the breast-plate nearer the knotter-actuating shaft and lower the knotter-actuating shaft, which is above the binder-table and on a plane with the binder-arm shaft, which is below the binder-table, as is well known, and to operate my knotter-jaws on a plane practically parallel with or near the lower edge of the cam-wheel, and thus contract the space usually required.
$D^2$ represents the knife, which is secured to the knotter-supporting sleeve-like frame D.

The cord-holder wheel or disk is actuated in the usual manner.

My invention herein consists in the novel construction and operation of the same.

I have heretofore arranged the disk in an angular position relatively to the breast-plate and cam-wheel and constructed the same in a form termed a "crown or cup disk," with the cord-notches in the flange, as shown in my Patent No. 379,494, dated March 13, 1888. The breast-plate C has a stud or upright G secured to it, the rear face of which is in a plane parallel with the plane in which the inclined rim $a$ moves in passing it, and to said lug is secured a stud-shaft $g$ in position at right angles to said plane of rim $a$. Upon the shaft $g$ is mounted a spur-wheel $h$, which is engaged by the rack-segment $a'$ at each revolution of the wheel $A'$ and has an intermittent rotary motion imparted to it thereby. Upon the shaft $g$, between the wheel $h$ and its supporting-lug G, is a triangular cam-plate $h'$, secured to and moving with the wheel $h$, and having concave sides, (indicated in dotted lines, Fig. 1,) conforming to the periphery of the rim $a$ and engaging therewith to hold the wheel $h$ stationary in the intervals between its intermittent movements. The cam plate or disk $h'$ is similar in construction to that described in Letters Patent No. 379,494, granted to me March 13, 1888, but is arranged in the plane of the rim $a$, the edge of which engages said plate and holds it and the wheel $h$ stationary, except when the latter is acted upon by the segment $a'$. In the present invention I construct my disk in a similar manner, $h^2$ representing the flange similar to that in my former application; but I have provided said flange $h^2$ on its outer edge with a peripheral rim or annular rib $h^4$ and its corresponding notches, as shown in Figs. 1 and 6, while the cord-holding shoe I has a corresponding longitudinal groove $i$, in which the cord-disk revolves, the spring J engaging the spur $i'$ on the under face of the shoe, holding the same in contact therewith, the spring J being secured to a boss or lug $c$ on the breast-plate.

The shoe I is provided with a projecting finger $i^3$ to aid in guiding and deflecting the cord to the cord-holding disk, in the operation of which as the binder-arm places the cord it is guided in contact therewith at the outer side where the cord enters the notch $h^3$ by means of the finger $i^3$, and the curved finger $i^4$ serves to prevent the cord from being caught on the rim $h^4$ of the cord-holder as the binder-arm recedes, as shown in Fig. 3. The front end or inner side of said shoe is provided with a finger $i^2$ and guard $i^5$, the latter formed by an extension of the shoe-guard $i$, extending upward in a plane parallel with the face of the obliquely-arranged cord-holder to prevent the cord from coming in contact with the rim or dropping into the notches of the cord-holder disk as the cord-holder rotates, while the outer finger $i^2$ serves as a stop and cord-guide to prevent the deflection of the cord and hold the same as the knife is brought in contact therewith in severing the cord. By this construction and operation I am enabled to dispense with the jointed knotter-shaft and the usual separate cord tucker and guide and knife, and thus simplify the construction and secure greater certainty of operation.

The shield or breast plate C is provided with an upper projecting rib $c'$, which is located flush with and follows the curve of the needle-slot, the end of which is elevated and inclined, Fig. 1, so that said inclined end will deflect the cord to its proper location, and as the needle advances toward the cord-holder this projection serves to guide and place the cord in proper relation to the cord-holder and the tying-bill.

The cord-disk and its delay-cam and gear-wheel, formed integral with it, are supported on a projection or lug preferably located on the breast-plate by means of a stud which serves as an axial bearing for said disk and are operated from the face side of the cam-wheel. The annular flange on said disk, which is also formed integral therewith, serves to aid in holding the strain of the cord and, in connection with the spring, securely retains the shoe against lateral displacement. It also aids in holding the cord between the shoe and wheel. The wheel $A'$ has a spur or projection $a^6$ formed on its forward or inner face, and a spring $k$, secured to a boss or lug $k'$ on the breast-plate, is deflected by said spur and springs up behind it just as the wheel $A'$ completes a revolution, effectually preventing any backward movement of the wheel and of the mechanisms actuated thereby.

The cord-holder hereinabove described is similar in its organization to that described in another application filed by me July 13, 1888, No. 279,816; but in the latter the cord-holder shoe is restricted to cover the clamping-face of the crown-disk between two only of its cord-notches for the purpose of releasing the end of the cord at the end of each throw or partial revolution of the cord-wheel—a restriction not embraced in this application.

Having now described my invention, I claim as new—

1. The knotter-actuating shaft and wheel or disk with its segmental gear, in combination with the knotter-frame suspended on said shaft, the sleeve carrying the knotter-shaft, pivoted at its upper end to said frame above the plane of the actuating-shaft, and the knotter-shaft journaled in said sleeve normally oblique to and crossing the plane of the actuating-shaft and carrying on its upper end a bevel-pinion directly engaging the segmental gear on the actuating-disk, substantially as and for the purpose described.

2. The combination, with the knotter-actuating shaft and disk with its segmental gear, provided inside of said gear with the recessed annular delay-rim permitting the vibration of and the cam-groove for vibrating the knotter-shaft, of the knotter-frame suspended on said actuating-shaft, the sleeve carrying the knotter-shaft, pivoted to said frame above the plane of the actuating-shaft, and the knotter-shaft journaled in said sleeve normally oblique to and crossing the plane of the actuating-shaft and carrying on its upper end a bevel-pinion directly engaging the segmental gear on the actuating-disk, substantially as described.

3. The combination, in a grain-binder, of the knotter-actuating shaft and its cam-wheel, the knotter-frame supported on said shaft, the knotter-shaft geared directly to said cam-wheel, and the sleeve or frame in which said knotter-shaft is journaled, adjustably connected to its actuating-arm for changing the throw of the knotter relative to the cord-holder and needle, said arm being pivoted on the knotter-frame above the knotter-actuating shaft and engaging a groove in the cam-wheel for vibrating the knotter-shaft, substantially as described.

4. The combination, in a grain-binder, of the knotter-actuating shaft and its cam-wheel, the knotter-frame supported on said shaft, the knotter-shaft journaled in a sleeve or frame pivoted on the knotter-frame and having an arm engaging a cam-groove in said cam-wheel, the bevel-pinion and delay-shoe rigid on the knotter-shaft, the segmental gear $a^2$ on the cam-wheel, and the recessed annular delay-flange, also on said cam-wheel, permitting the delay-shoe and pinion to vibrate toward the cam-wheel, substantially as and for the purpose described.

5. The notched annular flanged or crown disk cord-holder $h^2$ and the peripheral rib $h^4$ on the outer edge thereof, in combination with the cord-holder shoe provided with a corresponding groove to receive said rib, said cord-holder wheel and its pinion mounted on a stud secured to the breast-plate and revolving in a plane oblique to the main cam and gear wheel to receive the cord from the binder-arm and deliver it to the knotter, substantially as shown and described.

6. The peripheral rib $h^4$ on the notched cord-holder and crown-disk $h^2$, in combination with the cord-holder shoe provided with a corresponding groove to receive said rib and the cord-guide fingers $i^3$ and $i^4$ on the inner side of said shoe, as and for the purposes stated.

7. The combination, with the knotter-actuating cam and gear wheel A', of the cord-holder wheel and its pinion set to revolve in a plane oblique to the plane of the knotter-actuating wheel to receive the cord from the binder-arm and the shoe-extension $i^5$ on the outer end of the cord-holder shoe to guide the cord and prevent its catching on the rim and dropping in the notch of the cord-holder nearest the knotter as the cord-holder intermittently rotates, substantially as described.

8. The cord-holder wheel and the grooved cord-holder shoe I, provided on the end next the knotter with the projecting horn or extension-finger $i^2$, in combination with the pivoted knotter-frame and the knife rigidly secured to and swinging with said frame, substantially as described.

9. The annular rib $h^4$ on the cord-holder crown-disk, in combination with the longitudinally-grooved shoe I, to prevent lateral displacement of the shoe by the strain of the cord, substantially as shown and described.

10. The rotary cord-holder wheel and the toothed pinion and delay-cam rigid with said wheel and journaled on a stud secured to the breast-plate, in combination with the segmental rack and a notched annular retaining-flange on the cam-wheel directly engaging said pinion and delay-shoe, substantially as described.

11. The combination, with the cam-wheel A', having the inclined retaining-rim $a$, of the segmental gear $a'$ and the inclined and obliquely-arranged rotary cord-holder wheel $h^2$, arranged on the face side of said cam-wheel, substantially as described.

In testimony whereof I have hereunto set my hand this 17th day of April, A. D. 1888.

JOHN F. SEIBERLING.

Witnesses:
W. H. CARTER,
A. L. DICKINSON.